US011112487B2

United States Patent
Vossiek et al.

(10) Patent No.: US 11,112,487 B2
(45) Date of Patent: Sep. 7, 2021

(54) METHOD FOR PERFORMING IMAGING POLARIMETRY, TRANSPONDER, AND SYSTEM FOR PERFORMING IMAGING POLARIMETRY

(71) Applicant: FRIEDRICH-ALEXANDER— UNIVERSITAET ERLANGEN-NUERNBERG, Erlangen (DE)

(72) Inventors: Martin Vossiek, Fuerth (DE); Julian Adametz, Nuremberg (DE); Maximilian Poepperl, Bad Staffelstein (DE)

(73) Assignee: Symeo GmbH, Neubiberg/Muenchen (DE)

( * ) Notice: Subject to any disclaimer, the term of this patent is extended or adjusted under 35 U.S.C. 154(b) by 127 days.

(21) Appl. No.: 15/953,665

(22) Filed: Apr. 16, 2018

(65) Prior Publication Data

US 2018/0238995 A1 Aug. 23, 2018

Related U.S. Application Data

(63) Continuation of application No. PCT/EP2016/073327, filed on Sep. 29, 2016.

(30) Foreign Application Priority Data

Oct. 16, 2015 (DE) .......................... 102015117712.9

(51) Int. Cl.
*G01S 7/02* (2006.01)
*G01S 13/75* (2006.01)
(Continued)

(52) U.S. Cl.
CPC ............ *G01S 7/024* (2013.01); *G01S 13/751* (2013.01); *G01S 13/89* (2013.01); *H01Q 15/248* (2013.01); *H01Q 1/2208* (2013.01)

(58) Field of Classification Search
CPC .......... G01S 7/24; G01S 13/751; G01S 13/89; H01Q 15/248; H01Q 1/2208
(Continued)

(56) References Cited

U.S. PATENT DOCUMENTS

| 6,144,332 A | 11/2000 | Reindl et al. |
| 6,455,979 B2 | 9/2002 | Reindl et al. |

(Continued)

FOREIGN PATENT DOCUMENTS

| DE | 19709847 A1 | 9/1998 |
| DE | 202010018131 U1 | 5/2014 |

(Continued)

OTHER PUBLICATIONS

Shane Robert Cloude et al, "Polarimetric SAR Interferometry", IEEE Transactions on Geoscience and Remote Sensing, IEEE Service Center, Piscataway, NJ, US, (Sep. 1, 1998), vol. 36, No. 5, ISSN 0196-2892, XP011021082.

(Continued)

*Primary Examiner* — Bo Fan
(74) *Attorney, Agent, or Firm* — Laurence A. Greenberg; Werner H. Stemer; Ralph E. Locher

(57) ABSTRACT

A method serves for imaging polarimetry. A chipless, passive transponder which has a plurality of surface regions with different polarimetric properties is illuminated fully polarimetrically by radar radiation. At least one polarization-encoded image of the transponder is generated using the radar radiation reflected thereby, and the different surface regions of the transponder in the polarization-encoded image can be recognized by their at least one polarimetric property. The passive, chipless transponder has at least two surface regions with different polarimetric structures.

12 Claims, 2 Drawing Sheets

(51) Int. Cl.
*G01S 13/89* (2006.01)
*H01Q 15/24* (2006.01)
*H01Q 1/22* (2006.01)

(58) Field of Classification Search
USPC .................................. 342/42, 44, 22, 179
See application file for complete search history.

(56) References Cited

U.S. PATENT DOCUMENTS

| | | | |
|---|---|---|---|
| 7,821,398 B2 * | 10/2010 | Baba | B32B 37/185 |
| | | | 340/572.1 |
| 8,022,886 B2 | 9/2011 | Kai et al. | |
| 8,556,184 B2 | 10/2013 | Perret et al. | |
| 2002/0105469 A1 * | 8/2002 | Albats, Jr. | G01S 13/0209 |
| | | | 343/719 |
| 2005/0280504 A1 | 12/2005 | Pettus | |
| 2005/0280539 A1 * | 12/2005 | Pettus | H01Q 21/062 |
| | | | 340/572.1 |
| 2009/0014520 A1 * | 1/2009 | Kofman | G06K 19/06037 |
| | | | 235/439 |
| 2009/0231104 A1 | 9/2009 | Kofman et al. | |
| 2014/0111395 A1 * | 4/2014 | Bauer-Reich | H01Q 1/38 |
| | | | 343/787 |

FOREIGN PATENT DOCUMENTS

| | | |
|---|---|---|
| EP | 1993168 A2 | 11/2008 |
| EP | 2767849 A2 | 8/2014 |
| WO | 9313495 A1 | 7/1993 |
| WO | 0039604 A1 | 7/2000 |
| WO | 2009126999 A1 | 10/2009 |
| WO | 2011098719 A2 | 8/2011 |
| WO | 2013096995 A1 | 7/2013 |
| WO | 2015041295 A1 | 3/2015 |

OTHER PUBLICATIONS

Zainud-Deen S H et al, "Dual-polarized chipless RFID tag with temperature sensing capability", 2014 31st National Radio Science Conference (NRSC), IEEE, doi:10.1109/NRSC.2014.6835054, ISBN 978-1-4799-3820-9, (Apr. 28, 2014), pp. 9-16, XP032606543.

Zomorrodi Mohammad et al, "Cross-polarized printable chipless RFID tag with superior data capacity", 2014 44th European Microwave Conference, European Microwave Association, (Oct. 6, 2014), pp. 766-769, XP032706758.

Md Aminul Islam et al, "Design of a 16-bit ultra-low cost fully printable slot-loaded dual-polarized chipless RFID tag", Microwave Conference Proceedings (APMC), 2011 Asia-Pacific, IEEE, (Dec. 5, 2011), ISBN 978-1-4577-2034-5, pp. 1482-1485, XP032152928.

Arnaud Vena et al, "A Depolarizing Chipless RFID Tag for Robust Detection and Its FCC Compliant UWB Reading System", IEEE Transactions on Microwave Theory and Techniques, IEEE Service Center, Piscataway, NJ, US, (Aug. 1, 2013), vol. 61, No. 8, ISSN 0018-9480, pp. 2982-2994, XP011522354.

* cited by examiner

METHOD FOR PERFORMING IMAGING POLARIMETRY, TRANSPONDER, AND SYSTEM FOR PERFORMING IMAGING POLARIMETRY

CROSS-REFERENCE TO RELATED APPLICATION

This is a continuation application, under 35 U.S.C. § 120, of copending international application No. PCT/EP2016/073327, filed Sep. 29, 2016, which designated the United States; this application also claims the priority, under 35 U.S.C. § 119, of German patent application No. DE 10 2015 117 712.9, filed Oct. 16, 2015; the prior applications are herewith incorporated by reference in their entirety.

BACKGROUND OF THE INVENTION

Field of the Invention

The invention relates to a method for imaging polarimetry in which a chipless, passive transponder or "tag" that has a number of surface regions with different polarimetric properties is used and in which at least one image of the transponder is generated on the basis of the radar radiation reflected from it. The invention also relates to a passive, chipless transponder. The invention also relates to a system for carrying out the method with at least one reader and at least one transponder. The invention can be used for example for reading information at high temperatures.

Radio frequency identification (RFID) systems with a reader or interrogator and a transponder to be interrogated are used in a wide variety of applications. Transponders (also referred to as "RFID tags") can in principle be divided here on the basis of their structure into active, semi-passive and passive systems, as described for example by Stevan Preradovic, Nemai C. Karmakar and Isaac Balbin in "RFID Transponders", IEEE Microwave Magazine, October 2008, pages 90 to 103. Furthermore, a distinction is made between chipless and chip-based transponders, while active and semi-passive systems generally use chip-based transponders, but passive transponders can also have semiconductor chips for storing information, see published, European patent application EP 1 993 168 A2, corresponding to U.S. Pat. No. 8,022,886. Disadvantages of chip-based transponders are their high costs and, because of the semiconductor components used and the associated structural and connection technology, their particular susceptibility to external influences such as high or very low temperatures and mechanical shock and vibrations. A further disadvantage of chip-based transponders is the necessity for an energy supply to supply the semiconductor chips and, in the case of active chip-based transponders, the limited lifetime due to the battery life.

Chipless transponders can in turn be divided into transponders for time-domain-based (TDR), frequency-based (FDR) or image-based systems.

Because of the way in which they work, TDR systems use surface acoustic wave (SAW) transponders or microwave transponders. Microwave transponders encode their information in their pulse response, long delay times on the transponder being necessary. To obtain these delay times, large geometrical structures must be used, whereby increased losses and in many cases dispersion may occur. In the case of SAW transponders, a required delay time can be achieved by a wave conversion from electromagnetic waves to acoustic waves, since acoustic waves have much slower propagation velocities. The information can be encoded in the case of SAW transponders in a way analogous to microwave-based systems, as disclosed in international patent disclosure WO 2000 039 604 A1. However, this wave conversion produces great losses, which reduces the range of such systems.

FDR systems evaluate a frequency response of a transponder, resonant structures usually being used, as described for example in international patent disclosures WO 2011 098 719 A4 (corresponding to U.S. Pat. No. 8,556,184) or WO 2009 126 999 A1. Resonances of structures of the transponder must in this case be separable from one another. There are techniques for carrying out a separation of the resonances on the basis of the frequencies or spatially.

In the case of spatial separation, imaging systems may be used, see M. Zomorrodi and N. C. Karmakar: "Image-based Chipless RFID System with High Content Capacity for Low Cost Tagging", IEEE International Microwave and RF Conference, pages 41 to 44, Dec. 15 to 17, 2014. In this case, the evaluation of the polarization of the emitted and received electromagnetic waves is only used for reducing disturbances due for example to multipath propagation. A further use of polarization in RFID tags is so-called polarization multiplexing, in which two data channels are separated with the aid of polarization, as disclosed by M. A. Islam and N. Karmakar: "Design of a 16-bit Ultra Low Cost Fully Printable Slot-Loaded Dual-Polarized Chipless RFID Tag", *Proceedings of the Asia-Pacific Microwave Conference*, pages 1482 to 1485, Dec. 5 to 8, 2011 or WO 2013 096 995 A1. In addition, with the aid of polarization in the case of FDR tags, an amplitude modulation can be achieved, as disclosed by A. Vena, E. Perret and S. Tedjni in "A Depolarizing Chipless RFID Tag for Robust Detection and Its FCC Compliant UWB Reading System", IEEE Transactions on Microwave Theory and Techniques, Vol. 61, 2013, No. 8, pages 2982 to 2994.

Chipless RFID transponders nowadays have a wide variety of applications; in particular, they are intended to replace the widely used barcode, since the latter has several disadvantages, such as that it cannot be read if it is affected by contamination or weathering. Furthermore, the transponder can be used for locating or tracking objects (see published, non-prosecuted German patent application DE 197 098 47 A1 or German utility model DE 20 2010 018 131 U1) and also as a sensor for measuring temperature, pressure or humidity (see international patent disclosure WO 1993 013 495 A1, corresponding to U.S. Pat. No. 6,144,332).

A disadvantage of chipless RFID systems is their high required bandwidth, which is necessary both in the case of TDR and FDR systems for a high data capacity. In this case, the bandwidth cannot be freely set as desired because of statutory regulations. The data capacity is greatly restricted in the case of such systems. Thus, for example, in the case of microwave-based TDR systems, data rates of around 16 bits can be achieved and in the case of FDR systems, data rates of up to 35 bits can be achieved. For SAW transponders, data rates of 96 bits are commercially available and of up to 128 bits have been scientifically described.

In this case, the production of SAW transponders is not feasible at a reasonable cost. Apart from complex structuring, special materials such as $LiNbO_3$ must be used. For FDR transponders, materials of which the permittivity is exactly known must be used. For TDR transponders which are intended for microwave systems, low-dispersion and low-loss materials must be used. The materials and structures of the chipless RFID transponders described have not so far been suitable for use at very high temperatures. A further disadvantage is the low range of all the so far existing RFID systems with chipless passive transponders.

Polarimetry is in principle in widespread use for many radar applications, in particular in the case of high-resolution imaging systems. Polarization-agile imaging systems are used inter alia in remote Earth sensing (see international patent disclosure WO 2015 041 295 A1) or in security technology (see J. Adametz and L.-P. Schmidt: "Threat Object Classification with a Close Range Polarimetric Imaging System by Means of H-Alpha Decomposition", European Radar Conference, pages 77 to 80, Oct. 9 to 11, 2013). In all cases, the polarimetric scattering information of targets is used for the more precise classification or identification of unknown objects. Many evaluation algorithms for this have been described in the literature. In the area of radar imaging, Synthetic Aperture Radar (SAR) methods are often used for scanning, passing over or running through the region of interest or the object to be analyzed and special reconstruction algorithms are used to calculate an image, as disclosed in published, European patent application EP 2 767 849 A2. This is also used for the purpose of presenting the spatial separation of structured areas and non-structured areas by M. Zomorrodi and N. C. Karmakar.

If the SAR scan is carried out fully polarimetrically, i.e. the target or the scenery is illuminated sequentially with at least two differently polarized waves, preferably with two orthogonally polarized waves, and the polarization of the scattered waves is recorded, after the SAR processing a classification of the objects present can be carried out on the basis of the polarimetric information. In remote sensing, in this way it is possible for example—as described by T. Moriyama, S. Uratsuka and Y. Yamaguchi in "A Study of Extraction of Urban Areas from Polarimetric Synthetic Aperture Radar image", IEEE Geoscience and Remote Sensing Symposium, pages 703 to 706, Sep. 20-24, 2004— to differentiate very well-populated regions from forested regions. In security technology, it is possible by means of the fully polarized SAR scan to differentiate between different hazardous objects. These delimitations or categorizations are much more difficult to present with a conventional radar system, which does not have the fully polarimetric scattering information. In principle, a fully polarimetric data record contains the complete scattering information of a target, which can be used for an optimized classification or identification.

SUMMARY OF THE INVENTION

The object of the present invention is to overcome at least partially the disadvantages of the prior art and in particular provide an improved possibility for reading out information from a passive, chipless transponder by means of radio waves, in particular radar radiation.

This object is achieved according to the features of the independent claims. Preferred embodiments can be taken in particular from the dependent claims.

The object is achieved by a method for imaging polarimetry in which a chipless, passive transponder that has a number of areas or surface regions with different polarimetric properties or characteristics is irradiated by means of radio waves, in particular radar radiation, with at least two differently polarized waves, at least one polarization-encoded image of the transponder is generated on the basis of the radio waves, in particular radar radiation, reflected from it, and the different surface regions of the transponder are recognized in the polarization-encoded image by means of their at least one polarimetric property.

Irradiating by radio waves with at least two differently polarized waves corresponds in particular to being illuminated fully polarimetrically.

This provides the advantage that there are no increased costs and there is no susceptibility for example to temperature fluctuations and weathering because of semiconductor components, and the lifetime is not restricted by the battery life. Thus, high temperature applications, for example in furnaces, turbines, jet engines or steelworks, are also quite feasible.

Moreover, implementing an image-based system means that no delay time is required and avoids a wave conversion and the associated great losses to compensate for the delay time. The reading out of the data takes place by means of an imaging radar method, so that the information carried by the transponder need not be encoded in either the time-domain or frequency-domain response. In this case, the information of the transponder is stored purely in the polarimetric reflection properties of the surface regions or the associated portions and in their arrangement on the transponder. The combination of transponder and full polarimetry consequently provides an advantageous method for using chipless, passive RFID transponders that is based on imaging but uses polarimetry for storing information.

The fully polarimetric illumination or irradiation also allows the various surface regions of the correspondingly formed transponder to be identified and categorized particularly easily and reliably. By using fully polarimetric illuminating and measuring methods, extremely different structures can be separated from one another. This makes possible a particularly high number of possible information states per transponder. This in turn leads to a particularly high data capacity. A transponder with more than 128 bits can be implemented.

The method for imaging polarimetry can also be regarded as a method for reading a chipless, passive transponder.

The transponder may also be referred to as an identification tag or "tag". In particular, it has neither a semiconductor component nor an electrical energy store. The transponder may also be referred to as a radar-sensitive (RFID) transponder or radar transponder.

Surface regions with different polarimetric properties generate different, unequivocally differentiable or identifiable reflection patterns. The at least one polarimetric property of the respective surface regions (with or without a polarimetric structure) is already known in principle. The polarimetric properties of the surface regions are then therefore differentiable and unequivocally assignable with the aid of the measuring method used. The surface region may be a surface of the transponder, possibly with the volume or portion of the transponder lying thereunder.

Radar radiation can be understood in particular as meaning electromagnetic radiation in a range between 1 GHz and 1 THz. This means in particular that both transmitted and reflected radar waves can be described in a defined manner with regard to their polarization. In particular, the emitted and reflected radar radiation can be evaluated with respect to its polarization state. Illumination by radar radiation may take place fixedly in terms of space or the object or sequentially, for example by means of the SAR method.

The polarization-encoded image is in particular an image that is generated from the reflected radar radiation and the image points of which respectively have at least one piece of polarization information.

Partial images in the polarization-encoded image that are associated with the respective surface regions of the transponder can be identified for example by means of methods of object recognition.

Information can be derived from the recognized surface regions or partial images, for example in that the surface regions are used as information carriers analogous to bits with n (n>1) possible states. The information of the transponder is therefore encoded in its polarimetric backscattering behavior. Since this backscattering behavior of the structures used is defined and known, during the evaluation elements can be sought and classified on the basis of their properties. Each existing, previously defined backscattering behavior of a surface region that is differentiable from the backscattering behavior of other surface regions describes a possible information state. By arranging a number of elements with different polarimetrically effective structures, and consequently different information states, information can be stored on the transponder.

There is a configuration where at least one surface region is recognized from an associated polarization-encoded partial image by analytical calculation of the at least one polarimetric property. This may for example comprise applying analytical formulae to a partial image and comparing a result of the calculation with a predetermined "reference" result. The polarimetric backscattering behavior of the surface regions used can therefore be analytically specified or evaluated.

There is another configuration where at least one surface region is recognized on the basis of an image comparison of the associated partial image with at least one reference image. This may be carried out for example by means of methods of object recognition, it being possible for the reference image to be used like a reference object. The reference image may correspond to a predetermined surface region or an associated partial image.

There is a further configuration where the at least one polarization-encoded image of the transponder is subjected to a Pauli decomposition and the surface regions of the transponder are recognized from at least one Pauli-decomposed polarization-encoded image by means of their at least one polarimetric property. A Pauli-decomposed image is in particular an image that has been generated from the original fully polarimetric image by means of a Pauli decomposition. In the Pauli decomposition, the fully polarimetric scattering information at each pixel or image point is split into the individual scattering processes of single reflection, double reflection and subsurface scattering. A Pauli-decomposed image may therefore be an image representing single reflection, double reflection or subsurface scattering. This configuration has the advantage that different surface regions or partial images can be differentiated or recognized particularly well and reliably. At least one surface region can be recognized for example by means of an evaluation of only one Pauli-decomposed polarization-encoded image or partial image (for example representing single reflection). At least one surface region may for example be recognized by means of an evaluation of a number of Pauli-decomposed polarization-encoded images or partial images.

For the evaluation of the polarimetric data, some other suitable decomposition algorithm apart from the Pauli decomposition or in addition to the Pauli decomposition may be chosen for the fully polarimetric image data.

There is yet another configuration where at least one polarimetric property of at least one of these surface regions is generated on the basis of an incorporated polarimetrically effective structure. Thus, a reliably recognizable partial image can be generated by simple means. This also allows a multiplicity of different partial images to be generated, which makes a particularly high information density possible. A surface region with a polarimetrically effective surface that is smooth and homogeneous with respect to its material does not in particular have a polarimetrically effective structure. In the case of a smooth surface, the backscattering behavior is in particular independent of the polarization. In this sense, a structure is understood as meaning in particular a specifically generated, three-dimensional surface form, in particular a geometrical structure, and/or a polarimetrically effective material sequence. The polarimetrically effective structure may for example take the form of a roof mirror, a triple mirror, a dipole structure—for example in the form of wires, planar dipoles or planar meandering elements, etc.—a diffuse scattering body or the like.

In principle, in one variant a transponder may only have surface regions without a polarimetrically effective structure. In another variant, a transponder may only have surface regions with a polarimetrically effective structure. In yet another variant, a transponder has at least one surface region without a polarimetrically effective structure and at least one surface region with a polarimetrically effective structure.

In comparison with FDR or SAW tags, no high-precision structurings need to be provided here for the production of the structures of the surface regions.

The surface regions are so large, or have such geometrical dimensions, that they are chosen in accordance with the available resolving power of the imaging system, and in this way can be spatially separated from one another. The geometrical form—for example as a square—can be freely chosen as desired. The surface regions can be freely combined and arranged as desired on the transponder. The geometrical dimensions of the transponder determine the maximum number of surface regions that can be arranged on it.

There is a development where the polarimetrically effective structure is a regularly formed structure. The regularly formed structure may for example have a number of longitudinal grooves arranged parallel to one another, for example in order to produce a roof mirror—in particular a multiple roof mirror—for the radar radiation. The grooves may for example have side walls with predetermined angles ("angle of inclination") about a longitudinal alignment of the associated groove. Different partial images can be generated for example by setting this angle of inclination and/or by a predetermined angular arrangement ("tilting angle") of the surface regions, and consequently of the longitudinal alignment on the transponder. For example for a roof mirror, the backscattering behavior can be calculated in dependence on the tilting angle. Conversely, the tilting angle can be calculated back from the polarimetric backscattering behavior determined by the imaging radar. This allows the exact spatial alignment of the transponders, and consequently the composition of the transponder, to be unequivocally inferred. Consequently, the information transmission between the transponder and the reader is ensured by way of the polarimetric imaging.

Generally, at least one polarimetric structure may have at least one polarimetrically effective side wall, which has a predetermined angle of inclination and/or tilting angle.

There is also a configuration where at least one polarimetric property of at least one of these surface regions is recognized on the basis of its material. The transponder may therefore have surface regions or corresponding portions with different material or different material groups which display a markedly different polarimetric backscattering behavior, in particular a different permittivity.

There is furthermore a configuration where a temperature of the transponder is determined from at least one polarimetric property of at least one portion. Thus, the transponder can be used as a temperature sensor, specifically even at high temperatures.

There is also a configuration where at least one portion has a structure or form (including extent) that changes in terms of its polarimetric effect temperature-dependently. For example, the surface region or the portion having the surface region may have at least one roof mirror formed as a bimetal piece. Changing of the temperature has the effect that the side angles or angles of inclination of the roof mirror change, and as a result the reflection behavior of the structure changes. The temperature can be determined from the change in the backscattering behavior. This configuration has the advantage that the temperature can be determined on the basis of just this portion.

A further possibility of temperature measurement with the aid of the transponder is to imbue, for example coat or fill, reflecting elements with materials of a permittivity that is dependent on the temperature. The temperature can then be determined for example by way of the difference in the phase of the reflected radar radiation in relation to portions that are not made temperature-dependent, in particular by being coated or filled.

Yet a further possibility of using the transponder as a temperature probe or temperature sensor is obtained for example by utilizing different coefficients of thermal expansion of different materials. This effect influences the height of the individual portions. In this case, for example, the temperature can be determined by way of a difference in the phase of the radar radiation reflected by the two portions.

The object is also achieved by a passive, chipless transponder, having at least two surface regions with different polarimetric structures. The transponder may be formed in a way analogous to the method and provides the same advantages, and vice versa. It can be used with the method, but the method is not restricted to it.

The surface regions or associated portions are spatially separable or separated from one another, in particular are arranged next to one another or two-dimensionally. The transponder is in particular plate-shaped, the backscattering surface regions corresponding to parts of a main surface area of the plate.

A surface region may in particular have a surface of a portion of the transponder. Such a transponder therefore has at least two surface regions or portions with a different surface structure and/or material structure. In this sense, a continuously smooth surface of a portion that is homogeneous with respect to its material does not in particular represent a surface region or portion with a polarimetric structure. It is quite possible, however, for such a "smooth" surface region to be unequivocally identifiable.

There is another configuration where at least two portions have polarimetric structures with the same basic form, but different dimensioning and/or alignment (tilting angle) on the transponder. Different dimensioning may be for example a different height, width or angling, for example of a longitudinal groove of a roof mirror.

There is also another configuration where the transponder consists of one material or a composite of materials. It may in particular be produced in one piece. The different surface regions may then be produced by a surface treatment, for example by micro-milling. Alternatively, the transponder may have already been produced as a finished part, for example a casting or molding. Such a transponder can be produced particularly easily and is particularly robust.

There is furthermore a configuration where different surface regions are assigned materials with different polarimetric backscattering behavior. This provides the advantage that a differentiation and recognition of the surface regions can be reliably carried out even without a structuring. Moreover, this allows sensor functionalities to be implemented particularly easily.

Apart from electrical conductors—such as metals—ceramics or polymers or plastics are also suitable as the material or materials. For example, the transponder may take the form of a solid block of aluminum. High temperature resistant materials such as ceramics are very suitable for applications at high temperatures, since then the high temperatures do not cause any deformation of or damage to the materials. The use of combinations of materials is additionally possible. The almost unlimited choice of materials and undemanding requirements for production tolerances can be used for low-cost production.

At least one of the surface regions may be provided with a coating, which either improves reading or determination of its polarimetric property or is polarimetrically ineffective. The coating may comprise a single layer or a number of layers containing one or more materials. The coating may be a lacquering. Such a coating may for example be a protective coating, for example against mechanical and/or chemical effects—for example corrosion. In addition or as an alternative, the at least one coating may intensify a reflection, in order to obtain a more exact image, and/or in order to change it temperature-dependently.

The object is also achieved by a system that has at least one reader and at least one transponder as described above. The reader may be configured for running the method described above. If there is a known distance from the reader to the transponder or if an autofocusing method is included, the information content of the polarimetric transponder is not dependent on the bandwidth, as in the case of conventional chipless RFID systems. As a result, the data capacity is not restricted by statutory regulations. Thus, a system which offers a novel application of polarimetric imaging, which is used here for the first time for information exchange, is provided.

What is more, in particular, a two-dimensional arrangement of the surface regions can be used, it being possible for a wide variety of information states per surface region to be used. Also, much higher data capacities than in the case of conventional chipless systems can consequently be achieved. A limiting element in this case is the geometrical size of the transponder in relation to the resolving power of the reader, in particular its imaging radar. This can be improved by increasing the frequency or a size of aperture. An improved resolving power allows the structure size or the size of a transponder to be reduced, with the result that there is room for more surface regions on a transponder of the same overall size.

The properties, features and advantages of this invention that are described above and the manner in which they are achieved become clearer and more clearly understandable in connection with the following schematic description of an exemplary embodiment, which is explained in greater detail in connection with the drawings. For clarity, elements that are the same or have the same effect may be provided here with the same designations.

Other features which are considered as characteristic for the invention are set forth in the appended claims.

Although the invention is illustrated and described herein as embodied in an imaging polarimetry, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
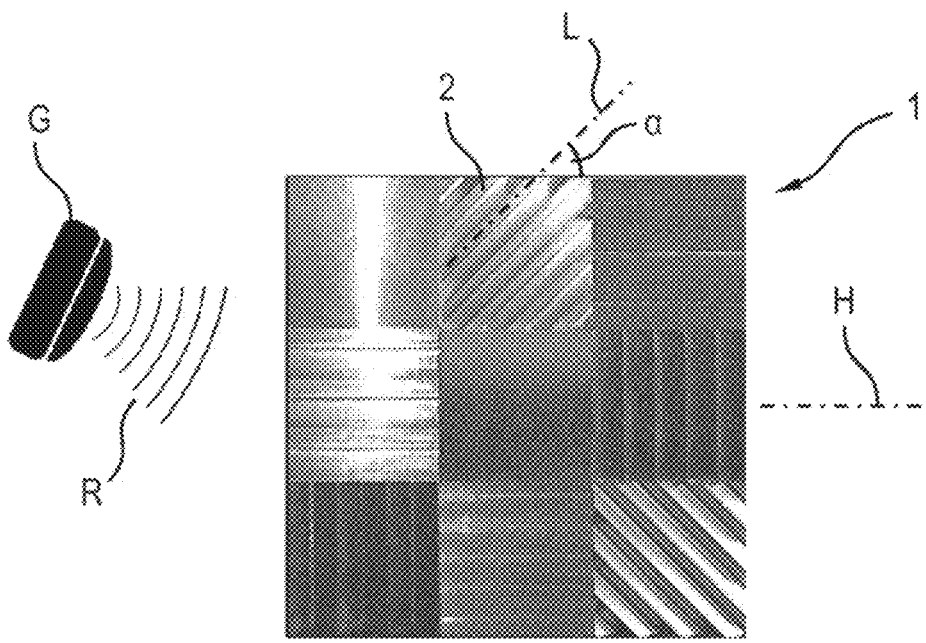
FIG. 1 is a polarimetric radar image of a radar transponder according to the invention with various surface regions.

Referring now to the figures of the drawings in detail and first, particularly to FIG. 1 thereof, there is shown a transponder 1, which is formed as a plate-shaped aluminum part with a contour that is square in plan view. An edge length may be for example about 10 cm. The transponder 1 may be irradiated by a reader G with fully polarized radio waves, in particular radar radiation R. The radiation reflected or backscattered at the transponder 1 can be detected by the reader G and evaluated there or in an independent evaluation device (not depicted). In particular, at least one image B1 to B3 (see for example FIGS. 3 to 5) of which the image points carry a piece of polarization information can be generated by means of the detected backscattered radiation.

Figure 2:
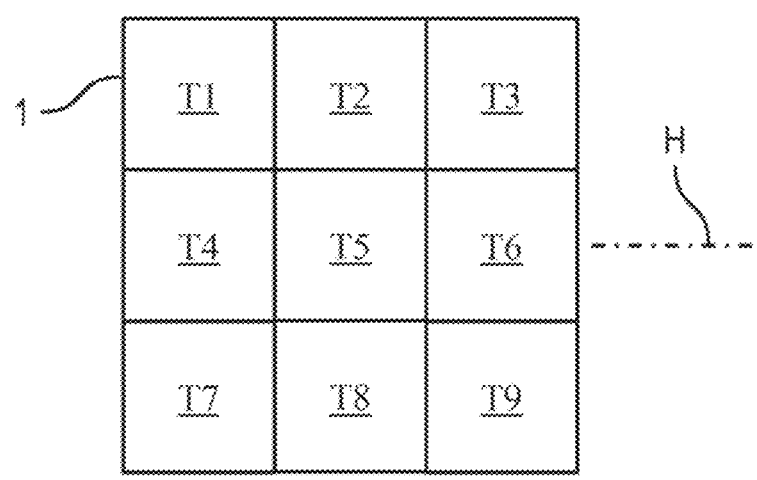
FIG. 2 is a diagram showing surface regions of the radar transponder from FIG. 1.

FIG. 2 shows a diagram of nine zones or surface regions T1 to T9 of the transponder 1. The surface regions T1 to T9 likewise have a square form and are of the same size.

The polarimetric characteristics of the surface regions T1 to T9 can be differentiated and unequivocally assigned with the aid of the radar-interrogating measuring method used. The information of the transponder 1 is encoded in the polarimetric backscattering behavior. Since the backscattering behavior of the surface regions T1 to T9 used is defined and known, during the evaluation they can be sought and classified on the basis of their properties. Each existing, previously defined backscattering behavior describes a possible information state. By arranging a number of surface regions T1 to T9 that can be differentiated from one another here by their geometrical surface structure or the absence thereof, and consequently different information states, information can be stored on the transponder 1.

In the case of the transponder 1, for example, there are surface regions T1 to T9 with five different information states. For this purpose, the two surface regions T1 and T5 are formed as smooth surface regions. The surface region T2 is formed as a roof mirror with a tilting angle $\alpha$ of a longitudinal axis L of parallel longitudinal grooves 2 incorporated therein of +45° with respect to the horizontal H. The surface regions T3, T4 and T8 are formed as roof mirrors with a tilting angle $\alpha$ of the parallel longitudinal grooves 2 incorporated therein of +0° with respect to the horizontal H. The surface regions T6 and T7 are formed as roof mirrors with a tilting angle $\alpha$ of the parallel longitudinal grooves 2 incorporated therein of 90° with respect to the horizontal H and the surface region T9 is formed as a roof mirror with a tilting angle $\alpha$ of the parallel longitudinal grooves 2 incorporated therein of −45° with respect to the horizontal H. In this example, a code size of 20 bits would be obtained. In this case, the information content of a transponder 1 depends on the one hand on the number of possible information states per zone or surface region and on the other hand on the number of usable zones or surface regions. With more surface regions, high data rates can in this way be achieved.

In practice, surface regions with triple mirrors, dipole structures (for example wires, planar dipoles or planar meandering elements), diffuse scattering bodies or the like may be used for example as structures. In this case, it should be generally ensured that the individual surface regions are separable from one another both polarimetrically and spatially. This means that the geometrical dimensions of the surface regions should be chosen on the basis of the available resolving power of the imaging system. The geometrical form of the surface regions—here a square—can in this case be freely chosen as desired. The surface regions can be freely combined and arranged as desired on a transponder. The maximum geometrical dimensions determine the maximum number of elements of a transponder.

Figure 3:
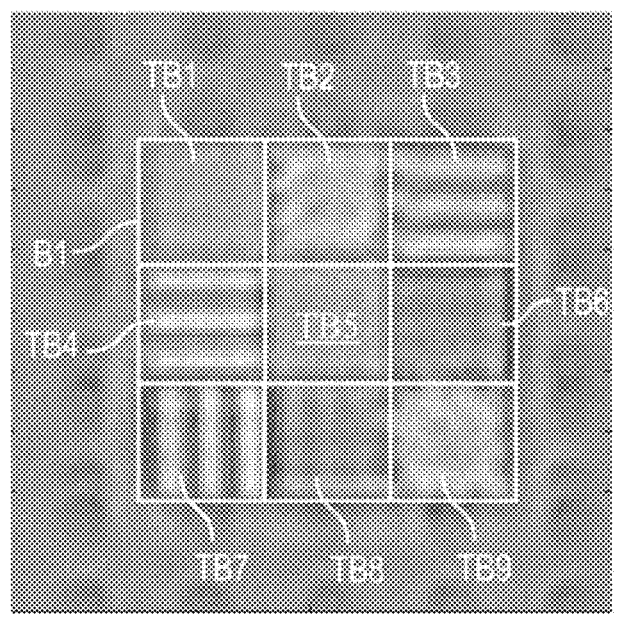
FIG. 3 is an image of the radar transponder of which the image points indicate the intensities of the scattering processes.

FIG. 3 shows an image of the transponder 1 of which the image points indicate the intensities of the scattering processes. In particular, this applies to the overall intensity represented, i.e. the sum of all the individual results of the Pauli decomposition. In this case, FIG. 3 shows a grayscale image B1, while the intensities of the scattering processes can also be advantageously represented on the basis of an RGB color scale. The image B1 has partial images TB1 to TB9, which correspond to the surface regions T1 to T9 and represent the radiation backscattered from these surface regions T1 to T9. On the basis of this graphic representation, first the smooth surface regions T1 and T5 can be unequivocally differentiated from the other surface regions T2 to T4 and T6 to T9, which act as roof mirrors for the incident radar radiation. Furthermore, some of these surface regions T2 to T4 and T6 to T9 can already be differentiated from one another.

Figure 4:
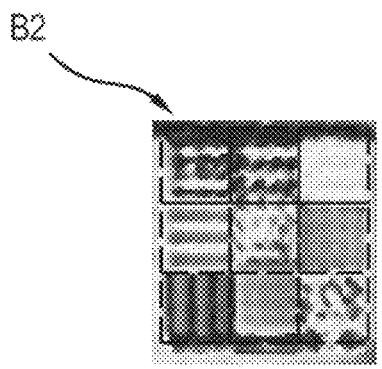
FIG. 4 is a Pauli-decomposed image of the radar transponder which indicates double reflection.

FIG. 4 shows a Pauli-decomposed image B2 of the transponder 1 which only indicates the double reflection components of the scattering processes—to be more precise the phases associated with double reflection. In this case, corresponding partial images (without designations) are generated, bordered here by the lines depicted as dashed.

Figure 5:
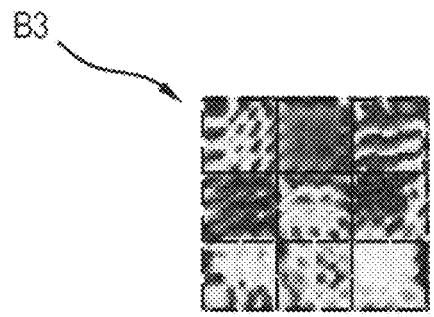
FIG. 5 is a Pauli-decomposed image of the radar transponder which indicates subsurface scattering.

FIG. 5 shows a Pauli-decomposed image B3 of the transponder 1 which only indicates the subsurface scattering components of the scattering processes—to be more precise the phases associated with subsurface scattering. Here, too, corresponding partial images (without designations) are generated, bordered here by the lines depicted as dashed.

Figure 6:
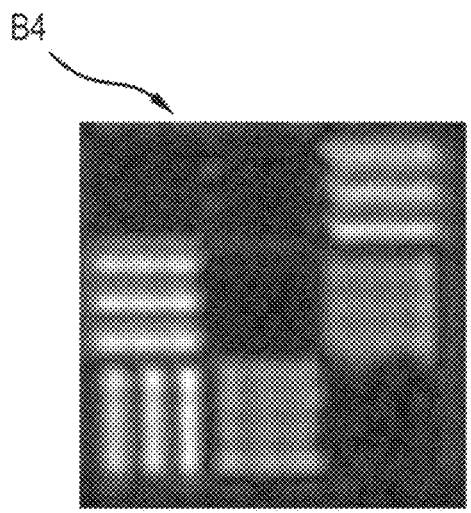
FIG. 6 is an image showing an intensity of the component of the double reflection of the Pauli decomposition in the case of a Pauli-decomposed image of the transponder.

FIG. 6 shows an intensity of the component of the double reflection of the Pauli decomposition in the case of a Pauli-decomposed image B4 of the transponder 1. In this case, here again nine schematically shown corresponding partial images are generated.

Figure 7:
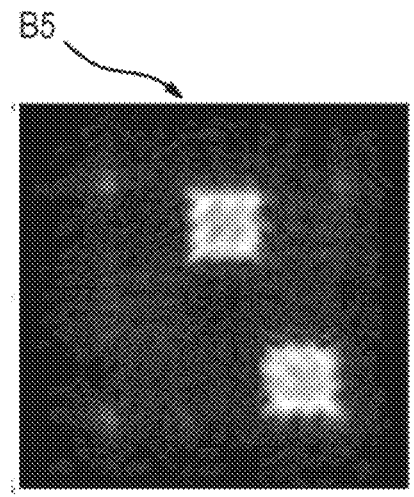
FIG. 7 is an image showing an intensity of the component of the subsurface scattering of the Pauli decomposition in the case of a Pauli-decomposed image of the transponder.

FIG. 7 shows an intensity of the component of the subsurface scattering of the Pauli decomposition in the case of a Pauli-decomposed image B5 of the transponder 1. Here, too, again nine schematically shown corresponding partial images are generated.

FIGS. 4 to 7 also show grayscale images, while the intensities of the scattering processes can advantageously also be represented on the basis of an RGB color scale.

By means of a comparison of the partial images from, for example, FIGS. 3-5 (in any suitable combination desired and/or with at least one reference (partial) image [not depicted]), also the previously not yet differentiated surface regions T2 to T4 and T6 to T9 with roof mirrors of different tilting angles can thus be unequivocally differentiated from one another. The partial images of FIGS. 6 and 7 can also be used for this.

In comparison with many previous RFID systems, the information in the transponder 1 presented is not encoded in either the time-domain or frequency-domain response. The reading out of the data of the transponder 1 takes place by means of an imaging radar method. In this case, the information of the transponder 1 is stored purely in the polarimetric reflection properties of the surface regions T1 to T9 and in their arrangement on the transponder 1.

The polarimetric backscattering behavior of the surface regions T1 to T9 used can be analytically specified. In the case of the smooth surface regions T1 and T5, the backscattering behavior is independent of the polarization. For the surface regions T2 to T4 and T6 to T9 with roof mirrors, the backscattering behavior can be calculated in dependence on the tilting angle. Conversely, the tilting angle can be calculated back from the polarimetric backscattering behavior determined by the imaging radar. This allows the exact alignment of the surface regions T1 to T9, and consequently the composition of the transponder 1, to be unequivocally inferred. Consequently, the information transmission between the transponder 1 and the reader G is ensured by way of the polarimetric imaging.

The combination of RFID, in particular radar reading, and polarimetry represents a new type of chipless, passive RFID systems, which though based on imaging, uses polarimetry for storing information. Furthermore, the system represents a novel application of polarimetric imaging, which is used here for storing information.

The flexible choice of material and the structure of the individual surface regions T1 to T9 make it possible for the transponder 1 to be used at high temperatures, where in addition to information transmission it can also be used as a temperature sensor.

Although the invention has been more specifically illustrated and described in detail by the exemplary embodiments shown, the invention is not restricted to these, and other variations may be derived from them by a person skilled in the art without departing from the scope of protection of the invention.

In general, "a", "one", etc. may be understood as meaning a singular or a plural, in particular in the sense of "at least one" or "one or more", etc., as long as this is not explicitly excluded, for example by the expression "exactly one", etc.

A numerical indication may also comprise the indicated number exactly and also a customary tolerance range, as long as this is not explicitly excluded.

The invention claimed is:

1. A passive, chipless transponder, comprising:
at least two surface regions each configured to generate differentiated polarimetric backscatter in response to polarimetric illumination, wherein at least one of said at least two surface regions having a three-dimensional surface form with at least one side wall having an angle of inclination and said three-dimensional surface form defining a roof mirror.

2. The transponder according to claim 1, wherein said at least two surface regions have a same basic form, but different dimensioning and/or alignment.

3. The transponder according to claim 1, wherein the chipless, passive transponder is formed of one material or a composite of materials.

4. The transponder according to claim 1, wherein different ones of said surface regions are assigned materials with different polarimetric backscattering behavior.

5. A system, comprising:
at least one passive, chipless transponder having at least two surface regions each configured to generate differentiated polarimetric backscatter in response to polarimetric illumination, wherein at least one of said at least two surface regions having a three-dimensional surface form with a plurality of parallel side walls each having an angle of inclination and said three-dimensional surface form defining a roof mirror; and
at least one reader for radar-based reading of said at least one passive, chipless transponder, said at least one reader programmed to:
irradiate said chipless, passive transponder by means of radar radiation with at least two differently polarized waves including a first polarized wave and a second polarized wave;
generate a first polarization-encoded image of said chipless, passive transponder on a basis of the radar radiation reflected from said chipless, passive transponder based on the first polarized wave, the radar radiation being reflected without an energizing current operating an integrated circuit on said transponder nor by use of an antenna on said transponder; and
generate a second polarization-encoded image of said chipless, passive transponder on a basis of the radar radiation reflected from said chipless, passive transponder based on the second polarized wave, the radar radiation being reflected without an energizing current operating an integrated circuit on said transponder nor by use of an antenna on said transponder;
decode an identifier of said passive, chipless transponder using the first and second polarization encoded images.

6. The transponder according to claim 1, wherein said at least two surface regions are aligned parallel to a horizontal line.

7. The system according to claim 5, wherein said at least two surface regions of said at least one transponder are aligned parallel to a horizontal line.

8. A passive, chipless and antennaless transponder, comprising:
at least two surface regions each configured to generate differentiated polarimetric backscatter in response to polarimetric illumination, wherein at least one of said at least two surface regions having a three-dimensional surface form with at least one side wall having a predetermined angle of inclination, the transponder responding to an interrogation from a reader without being provided an energizing current for operating an integrated circuit.

9. The transponder according to claim 8, wherein at least one of said at least two surface regions forms a roof mirror.

10. The transponder according to claim 8, wherein said at least two surface regions each form a roof mirror having parallel longitudinal grooves formed therein, but different angles of inclination.

11. The transponder according to claim 8, wherein said at least two surface regions do not form an antenna.

12. The transponder according to claim 8, further comprising a plate-shaped aluminum part having a surface containing said at least two surface regions.

\* \* \* \* \*